Nov. 18, 1930.  W. J. STALLAN  1,782,151

MEASURING OR DETECTING DEVICE

Filed Dec. 9, 1929

Inventor
William James Stallan
by David Rives
Attorney

Patented Nov. 18, 1930

1,782,151

UNITED STATES PATENT OFFICE

WILLIAM JAMES STALLAN, OF CAMBRIDGE, ENGLAND, ASSIGNOR TO CAMBRIDGE INSTRUMENT COMPANY, LIMITED, OF LONDON, ENGLAND, A CORPORATION OF GREAT BRITAIN

MEASURING OR DETECTING DEVICE

Application filed December 9, 1929, Serial No. 412,671, and in Great Britain June 6, 1929.

The present invention relates to measuring or detecting devices, and more particularly to the measurement or detection of very slight movements, such as the moving parts of seismographs, vibrographs, and similar instruments, are subjected to. The word "detecting" will be employed herein in a broad sense to include, also, "measuring".

In oil and mineral prospecting, for example, recording vibrographs are employed for determining the effects of prearranged explosions. These explosions are caused to make indications or records that enable one to ascertain the probability of the presence of oil or minerals. As the basic movements impressed upon the moving mass of the vibrograph by the explosion are of extremely small order, it is necessary to magnify them considerably to permit their inspection or recording.

An object of the present invention, therefore, is to provide a new and improved instrument for magnifying very small movements of the above-described character. Other objects will be explained hereinafter, and will be particularly pointed out in the appended claims.

With the above ends in view, a feature of the invention,—though the invention is not limited thereto,—resides in the use of a disc, mounted upon a spindle and rotatable about the axis thereof, in combination with a member connected, at one end, to a point of the moving part of the movement which is to be measured or detected and, at the other end, to a point of the disc. Preferably, the said point of the disc lies, throughout its range of movement, outside of the plane common to the axis of the disc and the moving point. A mirror fixed to the spindle of the disc is employed to reflect light rays from a source, the arrangement constituting an optical-lever system for further magnifying the movement, or the record of the movement, of the moving point.

Figure 1:
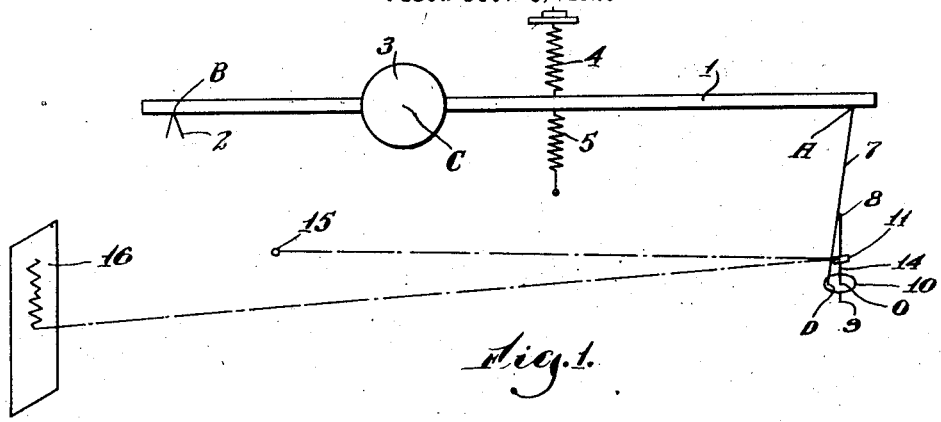
Figure 2:
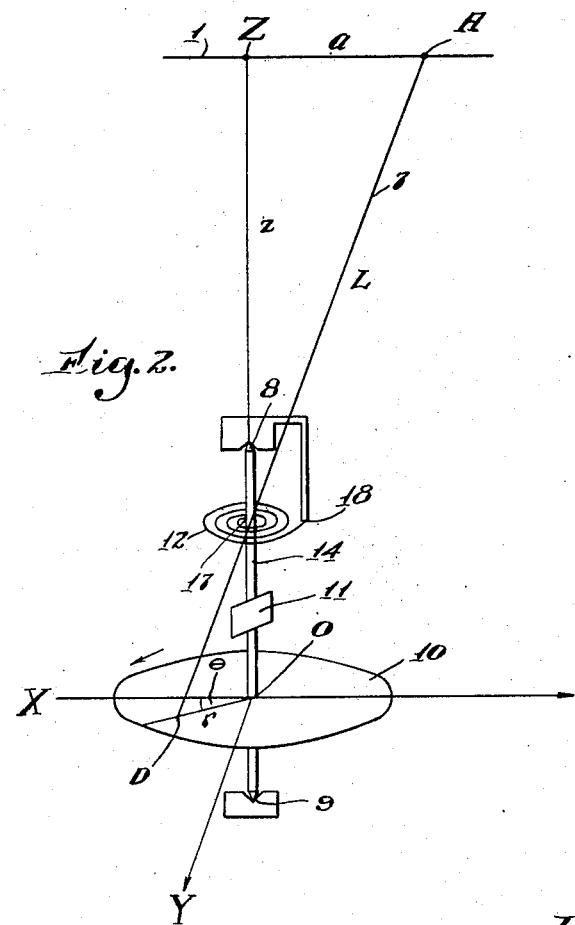

The invention will now be explained in connection with the accompanying drawings, in which Fig. 1 is a diagrammatic view of a vibrograph or seismograph embodying the present invention in its preferred form; and Fig. 2 is an enlarged detail of a portion of the mechanism shown in Fig. 1.

The moving point, the very small movement of which is to be detected, may be assumed to be at A, upon a moving member 1. The member 1 may typify any moving part, such as a vibrograph lever 1, pivoted at B upon a fulcrum 2, and weighted at the point C with a weight 3. The lever 1 may be spring supported at 4 and 5 to compensate for the effect of gravity upon the weight 3. In the illustrated embodiment of the invention, therefore, the point A is assumed to be subjected to slight vertical movements, but it will be understood that the invention is not so limited, but is so disclosed for illustrative purposes purely.

A rod or link 7 connects the moving point A on the lever 1 with a point D on a horizontally-disposed disc 10. A vertically-disposed spindle 14 joins the disc 10 at its center and its ends rest in vertically-disposed pivot bearings 8 and 9. A hair spring 12 is attached at one end 17 to the spindle 14 and at its other end to a fixed point 18 of the instrument. The point 18 may conveniently be located upon the pivot bearing 8. The hair spring thus maintains the link or rod 7 yieldingly in a position as close as possible to the plane containing the point A and the spindle 14. When the lever 1 moves downward, however, in response to shock, the link or rod 7 will also be forced downward, in opposition to the force exerted by the spring 12, causing the disc to turn or rock about the axis of the spindle 14 in the direction of the arrow of Fig. 2. Upon the return of the lever 1 to its normal position, the disc 10 will similarly be returned to its original position.

It will be understood, of course, that the disc 10 does not need to be horizontal, nor the spindle 14 vertical, the disclosed embodiment of the invention being for illustrative purposes only.

This turning movement of the disc 10 is many times as great as the very slight movement of the point A on the lever 1. The movement may, however, be magnified many times further by means of an optical-lever arrangement, such as a mirror 11, fixed to the spindle 14, for reflecting a beam of light from a light source 15 to a scale, photographic film, or other recording device 16.

The following analysis will indicate the degree of magnification of the movement of the moving point A:

Let L = the length of the rod or link 7, between the points A and D,
$a$ = the horizontal distance from the point A to the vertical axis OZ,
$r$ = the horizontal distance between the points O and D,
$z$ = the vertical distance from the point O to the point A, and
$\theta$ = the angle XOD.

It will be noted that L and $r$ are constants of the instrument. For practical purposes, the same may be said of $a$. As the point A moves up and down in response to shocks upon the instrument, its vertical distance $z$ above the point O is variable, and this causes the angle $\theta$ to vary also.

Let the center of coordinates O be taken at the center of the disc 10; the axis of coordinates OX as the horizontal line in the plane of the axis of the spindle 14 and the point A; the axis of coordinates OY as horizontal and normal to OX; and the axis of coordinates OZ as the vertical axis of the spindle 14.

Then the coordinates of the point A are $(-a, o, z)$ and those of the point D are $(r \cos \theta, r \sin \theta, o)$. It follows that the square of the length of the rod or link 7 is $$L^2 = (r \cos \theta + a)^2 + r^2 \sin^2 \theta + z^2.$$

In order to find what effect, $d\theta$, is produced upon $\theta$ by reason of a small change $dz$ in $z$, this expression may be differentiated with respect to $z$:

$$-(r \cos \theta + a) \; r \sin \theta . d\theta + r^2 \sin \theta \cos \theta . d\theta + z . dz = o,$$

or $$-a r \sin \theta . d\theta + z . dz = o.$$

To a first approximation, $z$ and L are equal. Hence, $$d\theta = \frac{L}{a r \sin \theta} dz.$$

From this, it readily appears that small movements $dz$ of the point A will be magnified into angular movements $d\theta$ of the disc 10 in proportion to the length L and inversely in proportion to the lengths $a$ and $r$ and the sine of the angle $\theta$. The length L should, therefore, theoretically, be made as large as possible and the lengths $a$ and $r$ and the angle $\theta$ as small as possible. In practice, $a$ and $r$ may be of the order of 10 and 1 millimeters each and L as much as 7 centimeters.

In view of the presence, at the point C, of the weight 3, the full effect of the shock will not be communicated to the point A. It will make its effect felt in the proportion $$\frac{BA}{BC}.$$

This ratio may be, say, from 2 to 10.

To determine what further magnifying effect is introduced by the source of light 15, the mirror 11 and the scale 16, the above expression should be multiplied by twice the distance of the scale 16 from the mirror 11. This distance may, in practice, be one or two meters.

Modifications will occur to persons skilled in the art, and all such are considered to fall within the spirit and scope of the invention, as defined in the appended claims.

What is claimed is:

1. An instrument for detecting very small movements of a point having, in combination, means connecting the point with another point that is constrained to move in a path that is not parallel to the path of movement of the first-named point, and means for detecting the movement of the second-named point.

2. An instrument for detecting very small movements of a point having, in combination, means connecting the point with another point that is constrained to move in a curved path in a plane disposed at an angle to the path of movement of the first-named point, and means for detecting the movement of the said other point.

3. An instrument for detecting very small movements of a lever about a pivot having, in combination, a link connecting a point of the lever with a point of a rocking disc the plane of which is disposed at an angle to the path of movement of the point of the lever, and means for detecting the movement of the disc.

4. An instrument for detecting very small movements of a point having, in combination, a link connecting the point with another point that is constrained to move along the arc of a circle, the said other point being outside of the plane common to the first-named point and the normal to the circle through the center of the circle, and means for detecting the movement of the said other point.

5. An instrument for detecting very small movements of a point having, in combination, a rocking disc, a link connecting the point with a point of the disc, whereby movements of the first-named point will be communicated to the disc, the said point of the disc being outside of the plane common to the first-named point and the axis of the disc, and means for detecting the rocking movement of the disc.

6. An instrument for detecting very small movements of a point having, in combination, a disc mounted on a spindle so as to be rotatable about the axis of the spindle, and a member connected by one end to the said moving point and by the other end to a point on the disc which lies outside the plane common to the axis of the disc and to the said moving point.

In testimony whereof I have hereunto set my hand.

WILLIAM JAMES STALLAN.